(12) United States Patent
Buchowiecki (10) Patent No.: US 11,149,943 B2
(45) Date of Patent: Oct. 19, 2021

(54) TOOL FOR RELEASABLY HOLDING A TORCH

(71) Applicant: Radoslaw K. Buchowiecki, Indio Hills, CA (US)

(72) Inventor: Radoslaw K. Buchowiecki, Indio Hills, CA (US)

(*) Notice: Subject to any disclaimer, the term of this patent is extended or adjusted under 35 U.S.C. 154(b) by 0 days.

(21) Appl. No.: 16/369,429

(22) Filed: Mar. 29, 2019

(65) Prior Publication Data
US 2020/0309365 A1    Oct. 1, 2020

(51) Int. Cl.
*F23D 14/28* (2006.01)
*F23D 14/46* (2006.01)
*F16M 11/14* (2006.01)

(52) U.S. Cl.
CPC ............. *F23D 14/28* (2013.01); *F16M 11/14* (2013.01); *F23D 14/46* (2013.01)

(58) Field of Classification Search
CPC .. F16M 11/14; F16M 2200/022; F23D 14/28; F23D 14/46; F23D 14/465; B23K 5/24
USPC .......... 248/688, 481, 181.1, 288.31
See application file for complete search history.

(56) References Cited

U.S. PATENT DOCUMENTS

| | | | | |
|---|---|---|---|---|
| 596,207 A | * | 12/1897 | Hart | F16M 11/041 403/90 |
| 1,280,304 A | * | 10/1918 | Roberts | F41A 23/12 89/40.06 |
| 1,672,808 A | * | 6/1928 | Hansel | B25B 1/20 269/160 |
| 1,677,889 A | * | 7/1928 | Gairing | B23Q 1/5443 269/73 |
| 1,697,117 A | * | 1/1929 | John | B25H 1/0007 269/265 |
| 2,386,042 A | * | 10/1945 | Elzeer | A61J 9/0638 248/106 |

(Continued)

OTHER PUBLICATIONS

West Marine, Ronstan Ball and Socket Swivel Base, unknown date, one (1) page.

*Primary Examiner* — Jorge A Pereiro
(74) *Attorney, Agent, or Firm* — Law Office of John W Harbst (57) ABSTRACT

A tool for holding a torch having a fuel containing cylinder at one end and a flame directing nozzle at an opposite end. The tool has a base with first and second parts arranged in a cooperative stacked relationship relative to each other and defining a spherical socket therebetween. The second part of the base has an open top. A positioning receptacle is seated and rotatable within the spherical socket defined by the base. The receptacle has a spherical outer surface and a cylindrical blind cavity opening to the spherical outer surface of the receptacle so as to receive and releasably hold a lengthwise portion of the fuel containing cylinder therewithin. A manually operable, spring biased assembly is mounted in operable combination with first and second parts of the base and is operable in either a locked condition or an unlocked condition. In the locked condition, the spring biased assembly applies a first clamping force to the outer spherical surface of the receptacle to restrain the receptacle in a selected and adjusted position and against movement relative to the base and applies a reduced clamping force to the outer spherical surface of the receptacle when in an unlocked condition.

14 Claims, 5 Drawing Sheets

(56) References Cited

U.S. PATENT DOCUMENTS

| | | | | |
|---|---|---|---|---|
| 2,469,859 A | * | 5/1949 | Charbeneau | A61J 9/0684 248/106 |
| 2,513,027 A | * | 6/1950 | Kruczek | B23Q 1/545 248/181.1 |
| 2,748,952 A | * | 6/1956 | Fleit | A47G 23/0241 211/74 |
| 2,964,201 A | * | 12/1960 | Huffman | A47F 7/00 211/115 |
| 3,144,232 A | * | 8/1964 | Smootz | F23D 91/02 248/141 |
| 3,815,892 A | * | 6/1974 | Tulk | B23Q 1/545 269/75 |
| 4,037,229 A | * | 7/1977 | Dunk | F16M 11/14 343/715 |
| 4,357,651 A | * | 11/1982 | Mayer | B60Q 1/0483 362/275 |
| 4,533,982 A | * | 8/1985 | Kozar | F21V 23/0414 362/183 |
| 4,538,984 A | * | 9/1985 | Nakagawa | F23D 14/28 431/255 |
| 4,571,882 A | | 2/1986 | Capea | |
| 4,917,527 A | * | 4/1990 | Bollinger | F16C 11/106 403/141 |
| D308,160 S | | 5/1990 | Sweeny et al. | |
| 5,069,433 A | * | 12/1991 | Womack | B25B 1/2457 269/277 |
| 5,071,279 A | * | 12/1991 | Rutstrom | F16M 11/14 403/90 |
| D335,676 S | * | 5/1993 | Szybura | D15/144 |
| 5,419,008 A | | 5/1995 | West | |
| 5,720,456 A | * | 2/1998 | Szybura | B23K 7/10 248/126 |
| 5,737,847 A | | 4/1998 | Britton | |
| 5,760,668 A | * | 6/1998 | Testa | B23Q 3/1546 335/285 |
| 5,787,228 A | * | 7/1998 | Fiely | B60H 1/00264 219/203 |
| 5,813,643 A | * | 9/1998 | Zybert | F17C 13/084 248/154 |
| 5,957,445 A | * | 9/1999 | Hagman | B23Q 1/545 269/75 |
| 5,965,045 A | | 10/1999 | Zigliotto | |
| 6,102,357 A | | 8/2000 | Papadatos | |
| 6,382,865 B1 | * | 5/2002 | Paxman | F16C 11/068 403/128 |
| 6,568,643 B2 | | 5/2003 | Black | |
| 6,568,871 B2 | * | 5/2003 | Song | F16C 11/06 403/131 |
| 7,246,781 B2 | | 7/2007 | Nam | |
| 7,478,500 B1 | * | 1/2009 | Pollock | A01K 97/06 206/315.11 |
| 7,597,301 B2 | | 10/2009 | Sell et al. | |
| 7,690,606 B1 | * | 4/2010 | Batdorf | B25H 1/00 248/181.1 |
| 8,322,699 B2 | * | 12/2012 | Prell | B25B 5/006 269/246 |
| 9,375,109 B2 | | 6/2016 | Hammond et al. | |
| 9,615,564 B2 | | 4/2017 | Liney | |
| 10,111,549 B2 | | 10/2018 | Nally | |
| 10,390,661 B1 | * | 8/2019 | Steingraber | F16B 1/00 |
| 2005/0045779 A1 | * | 3/2005 | Nan | F16M 11/14 248/133 |
| 2007/0120027 A1 | * | 5/2007 | Chang | B60R 11/02 248/205.5 |
| 2007/0138358 A1 | * | 6/2007 | Chang | F16M 13/022 248/205.5 |
| 2007/0151387 A1 | * | 7/2007 | Vogt | F16M 11/2021 74/473.34 |
| 2007/0152116 A1 | * | 7/2007 | Madsen | F16M 11/14 248/181.1 |
| 2008/0017764 A1 | * | 1/2008 | Nan | F16M 11/14 248/133 |
| 2012/0145699 A1 | * | 6/2012 | McMahan | H05B 3/0076 219/533 |
| 2012/0227678 A1 | * | 9/2012 | Milani | A01K 1/04 119/712 |
| 2014/0064547 A1 | * | 3/2014 | Bigeh | H04R 1/083 381/361 |
| 2016/0306264 A1 | * | 10/2016 | Chu | F16M 11/28 |
| 2016/0309080 A1 | * | 10/2016 | Chu | F16C 3/03 |
| 2017/0332770 A1 | * | 11/2017 | Miner | A41D 27/208 |
| 2018/0224056 A1 | * | 8/2018 | Guidolin | H04N 5/2251 |

* cited by examiner

TOOL FOR RELEASABLY HOLDING A TORCH

FIELD OF THE INVENTION DISCLOSURE

The present invention disclosure generally relates to a torch holder and, more specifically, to a tool for releasably holding a torch having a flame directing nozzle in any of a myriad of different positions.

BACKGROUND

A conventional butane/propane torch typically includes an elongated and generally cylindrical fuel tank. Such a torch also typically includes a separate flame directing nozzle releasably joined to and extending away from the tank or supply. The cylindrical tank of such a torch is of a size adapted to be grasped and held in the hand of a user. Torches of this type are used for a myriad of different operations requiring local heating, such as, soldering, removing paint, or softening of plastic or other elastomer materials or, alternatively, igniting tobacco and related products.

Although such torches are commonly grasped or held in a user's hand for most applications and operations, they are somewhat bulky. Also in directing the flame emitted from the nozzle of the torch in any particular direction, the operator has but one hand free to manipulate the piece being worked upon, be it steel, iron, plastic, a scrapper and the like. Moreover, the bulkiness of the torch often becomes tedious and frequently tiresome in view of the concentration required during the operation coupled with the one-handed operation.

In view of the above, there is both a need and a desire for a tool capable of firmly and steadily supporting a torch in a variety of different positions so as to enable a user to direct a flame emitted from the torch in any desired working direction.

SUMMARY

In view of the above, and in accordance with one aspect of this invention disclosure, there is provided a tool for releasably holding a torch having a fuel containing cylinder at one end. The fuel containing torch has a flame directing nozzle toward an opposite end thereof. In one form, the tool has a base including a first base portion and a second base portion arranged in a cooperative stacked relationship relative to each other and defining a spherical socket therebetween. The second portion of the base has an open top. A positioning receptacle is adapted to be seated and rotatable about X, Y and Z axes within the spherical socket defined by the base. The receptacle has a spherical outer surface and a cylindrical blind cavity which opens to the spherical outer surface of the receptacle so as to receive, snugly and releasably hold a lengthwise portion of the fuel containing cylinder therewithin whereby allowing the torch to be adjustably positioned about any of the X, Y and Z axes to thereby position the flame directing nozzle of the tool as desired. A manually operable, spring biased assembly is mounted in operable combination with first and second parts of the base and is operable in either a locked condition or an unlocked condition. The spring biased assembly is adapted to apply a first clamping force to the outer spherical surface of the receptacle when arranged in a locked condition so as to releasably maintain the receptacle in a selected and adjusted position relative to the base and for applying a reduced clamping force to the outer spherical surface of the receptacle when in an unlocked condition.

Preferably, the spring biased assembly comprises first and second manually operable mechanisms. Each mechanism of the spring biased assembly including a first part attached to the first portion, a second part attached to the second portion of the base, and a biasing mechanism. The spring biased mechanism pulls the first and second base portions toward each other as along as each manually operable mechanism is in a locked condition. In one form, the first and second manually operable mechanisms of the spring biased assembly are mounted on diametrically opposed sides of the spherical socket defined by the base.

In a preferred embodiment, the base of the tool further includes one or more magnets for releasably holding a metal utensil to the base. Moreover, the base of the tool preferably includes an apparatus for releasably securing the base to a surface. In one form, the apparatus for securing the base to a surface includes a suction cup attached toward a lower end of the base.

According to another aspect of this invention disclosure, there is provided a tool for releasably holding a torch having a fuel containing cylinder with a predetermined diameter at one end and a flame directing nozzle at an opposite end. The tool includes a base having at least two parts arranged in a cooperative stacked relationship relative to each other and defining a spherical socket therebetween. A second or upper part of the base has an open top. The two parts of the base are arranged in a releasably clamped relationship relative to each other. The tool also includes a receptacle for receiving, accommodating and releasably holding a lengthwise portion of the fuel containing cylinder of the torch therewithin. The receptacle has a spherical outer surface adapted to be received and accommodated within the spherical socket defined by the base for pivotal movements in multiple and opposed directions. Also, the receptacle defines a blind bore having a predetermined diameter substantially equal to the predetermined diameter of the fuel containing cylinder of the torch. The two parts of the base combine to define a closed ended and open-sided passageway which opens to and depends from a top of and along a lengthwise portion of the base. The passageway defined by the base of the tool has a predetermined width generally equal to or slightly greater than the predetermined diameter of the fuel containing cylinder of the torch so as to allow for enhanced pivotal movement of the torch whereby allowing for enhanced movement and positioning of the flame directing nozzle on the torch.

Preferably, the tool further includes a programmable timer attached to the base. Moreover, and in accordance with this aspect of the invention disclosure, the tool defines a stop for limiting pivotal travel of the fuel containing cylinder of the torch.

In one form, the tool further includes a manually operable, spring biased assembly mounted in operable combination with the two parts of the base and operable in either a locked condition or an unlocked condition. The assembly is adapted to apply a first clamping force to the outer spherical surface of the receptacle when arranged in a locked condition whereby constraining the receptacle against movement and in an adjusted position relative to the base. In an unlocked condition, the spring biased assembly applies a reduced clamping force to the outer spherical surface of the receptacle. In a preferred embodiment, the spring biased assembly comprises at least two spring biased mechanisms mounted on diametrically opposed sides of the spherical socket to the two parts comprising the base.

In a preferred embodiment, the base of the tool further includes an apparatus for securing the base to a surface. The apparatus for securing the base to the surface preferably includes a suction cup attached to an exterior surface on one of the parts comprising the base.

According to another aspect of this invention disclosure, there is provided a tool for releasably holding a torch having a fuel containing cylinder with a predetermined diameter at one end and a flame directing nozzle at an opposite end. The tool comprises a base comprised of upper and lower base members arranged in a cooperative stacked relationship relative to each other and defining a spherical socket therebetween. The upper base member defines an open top. A singularly formed receptacle is provided for receiving, accommodating and releasably holding a lengthwise portion of the fuel containing cylinder of the torch therewithin. The receptacle has a spherical outer surface extending about a majority of the outer surface thereof. The receptacle is adapted to be received and accommodated within the spherical socket defined by the upper and lower base members for pivotal movements in multiple and opposed directions. The receptacle defines a blind bore opening to the outer surface of the receptacle and has a predetermined diameter substantially equal to the predetermined diameter of the fuel containing cylinder of the torch. A manually operable assembly, operable in either a locked condition or an unlocked condition, is arranged in operable combination with the upper and lower base members so as to apply a first clamping force to the outer spherical surface of the receptacle when arranged in a locked condition whereby constraining the receptacle against movement and in an adjusted position relative to the base. When in an unlocked condition, the manually operable assembly applies a reduced clamping force to the outer spherical surface of the receptacle.

Preferably, the manually operable assembly comprises at least two spring biased hasp assemblies mounted on diametrically opposed sides of the spherical socket to the upper and lower parts comprising the base. In a preferred embodiment, the tool further includes a timer mounted to an exterior of the base. Moreover, one or more magnets are arranged in operable combination with the base. To facilitate attachment of an stability to the tool, the tool can further include an apparatus for releasably securing the base of the tool to a surface.

The upper and lower base members of the tool preferably combine to define a closed ended and open-sided passageway which opens to and depends from a top of and along a lengthwise portion of the base. The passageway has a predetermined width generally equal to or slightly greater than the predetermined diameter of the fuel containing cylinder of the torch so as to allow for enhanced pivotal movement of the torch whereby allowing for enhanced movement and positioning of the flame directing nozzle on the torch.

DETAILED DESCRIPTION

While this invention disclosure is susceptible of embodiment in multiple forms, there is shown in the drawings and will hereinafter be described a preferred embodiment, with the understanding the present disclosure is to be considered as setting forth an exemplification of the disclosure which is not intended to limit the disclosure to the specific embodiment illustrated and described.

Figure 1:
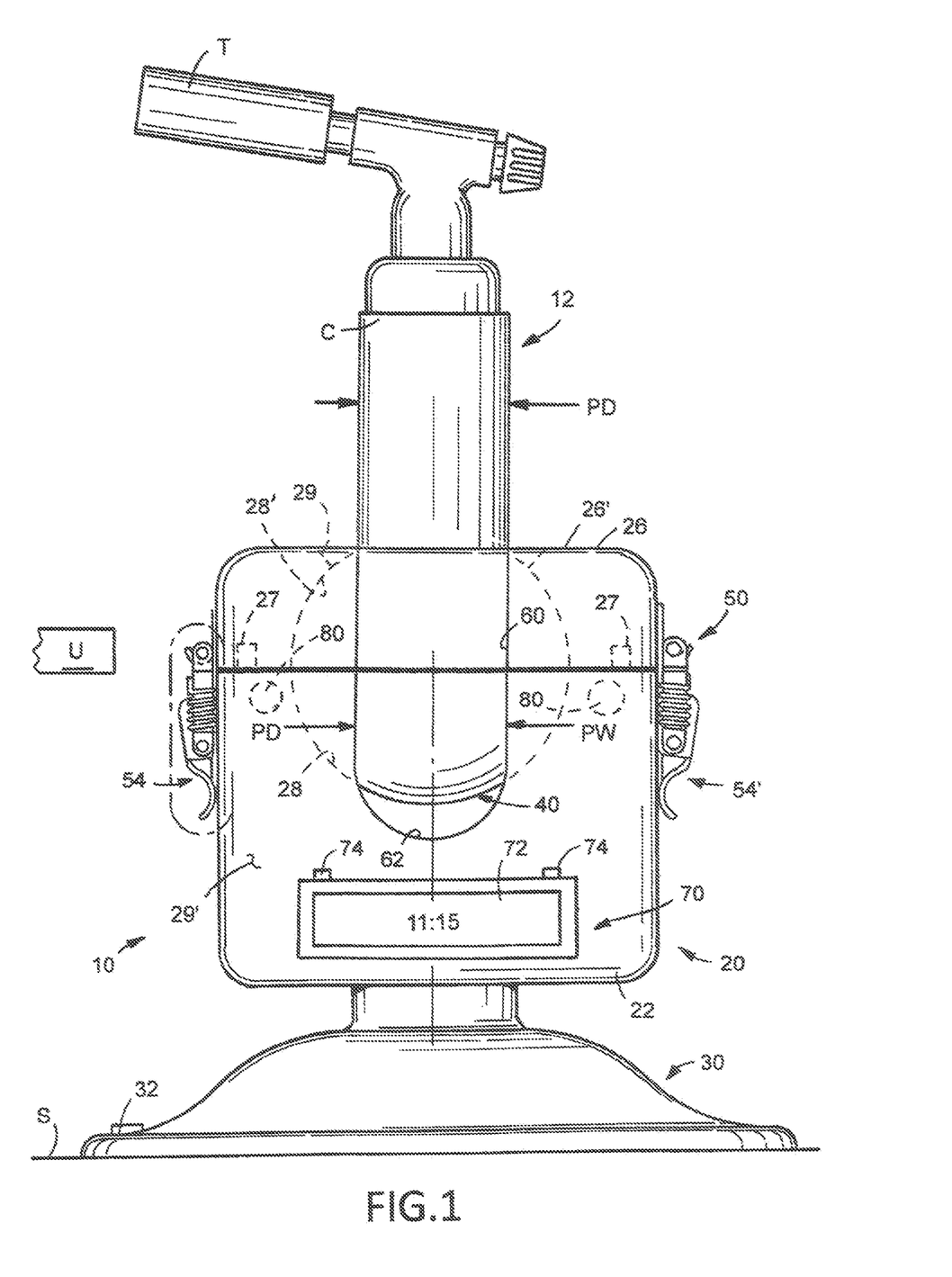
FIG. 1 is a front elevational view of a tool embodying principals and teachings of this invention disclosure.

Referring now to the drawings, wherein like reference numerals indicate like parts throughout the several views, there is shown in FIG. 1 a tool, generally identified by reference numeral 10, for releasably holding and positioning a torch 12. In the illustrated embodiment, torch 12 is a Blazer GT8000 Big Shot Butane Torch of conventional design including a flame directing nozzle portion T at one end and a fuel containing cylinder C at an opposed end. As illustrated in FIG. 1, and is typical, the fuel containing cylinder C of torch 12 has a predetermined diameter PD extending along and from a free end thereof.

Figure 2:
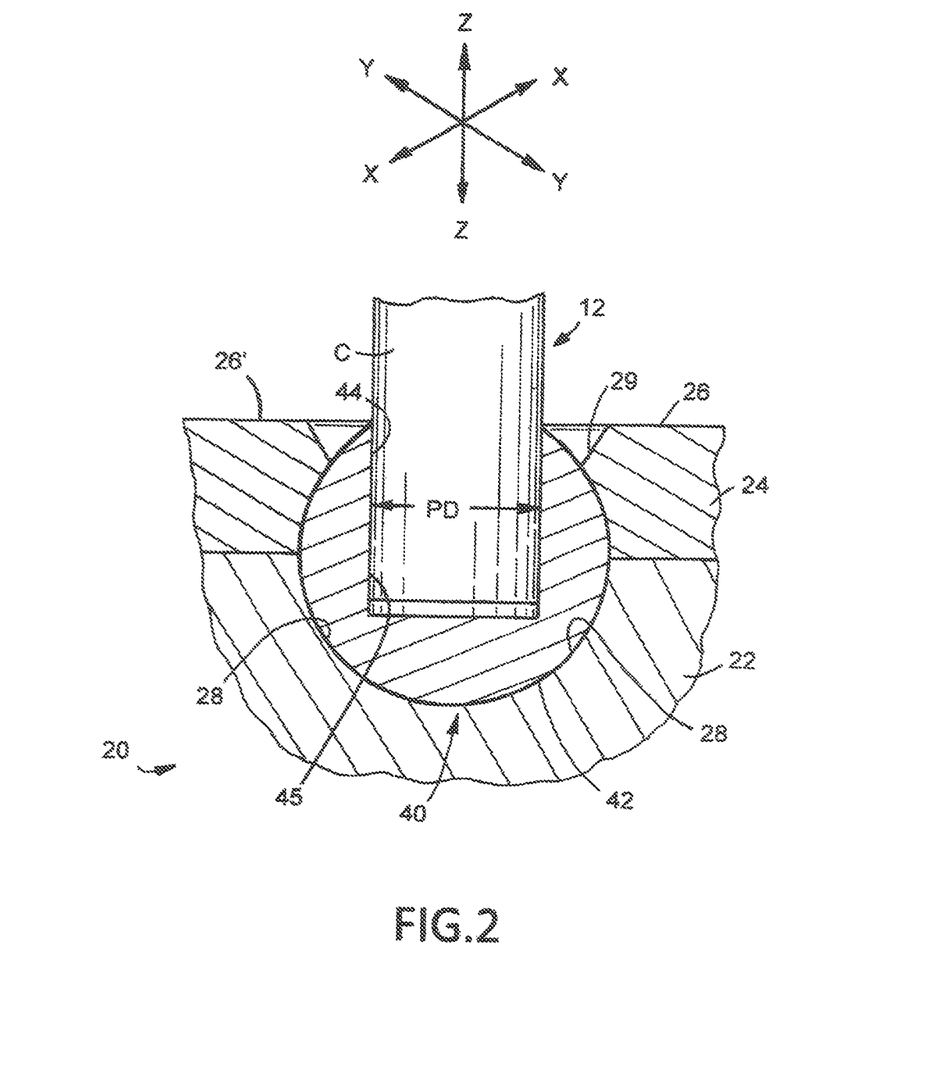
FIG. 2 is a fragmentary and longitudinal sectional view of a pocket area of the tool of the present invention disclosure.

Torch 12 is supported on a surface S by means of a base 20. Base 20 includes a first base portion or part 22 and a second base portion or part 24 arranged in a cooperative stacked relationship relative to each other. Notably, and as illustrated in FIG. 2, the second portion or part 24 of base 20 has an open top 26. Returning to FIG. 1, and to facilitate alignment of the stacked pieces 22, 24, suitable guide posts 27 project from the first base portion 22 and are accommodated in recesses defined by the second base portion 24. Of course, the arrangement of the guide posts 27 and recesses could be reversed on the parts 22 and 24 from that described without detracting or departing from the spirit and broad scope of the present invention disclosure. The two pieces 22 and 24 of base 20 are preferably fabricated from wood, plastic or other forms of suitable elastomers, or non-magnetic metal materials such as brass or the like.

As illustrated in FIGS. 1 and 2, an upper surface 26' on the open top 26 on the second base portion 24 preferably includes a chamfer or upwardly and outwardly angled surface 29 to facilitate guided passage of the fuel containing cylinder C of torch 12 through the open top 26 while furthermore enhancing the angular range of motion of the torch 12 relative to the base 10. Also, and as illustrated in FIGS. 1 and 2, the lower and upper parts 22 and 24, respectively, of base 20 combine to define a spherical socket 28 therebetween. As illustrated in FIGS. 1 and 2, the spherical socket defined by parts 22 and 24 of base 10 combine to define an inner spherical surface 28'.

In the embodiment illustrated by way of example in FIG. 1, base 20 can furthermore include an apparatus for releasably securing tool 10 to a surface S. That is, in one form, tool 10 can furthermore include a suction cup attachment apparatus 30 that permits attachment of base 20 of tool 10 to a wide variety of flat surfaces S while adding stability to the tool 10. A suitable and well known lifting tab or the like 32 can be provided adjacent to a periphery of the attachment apparatus 32 to facilitate release of suction built up between apparatus 30 and an engaged surface S so that base 10 can be readily and easily removed from surface S when desired or needed.

As illustrated in FIG. 2, a positioning receptacle 40 is adapted to be seated and rotatable about X, Y and Z axes within the spherical socket 28 defined by base 20. The receptacle 40 is singularly formed and is adapted to receive, accommodate and releasably hold a lengthwise portion of the fuel containing cylinder C of torch 12 therewithin. Receptacle 40 has a smooth spherical outer surface 42 adapted to be received for sliding and pivotal movements in multiple and opposed directions within the spherical socket 28 defined by base 20. As illustrated in FIG. 2, the inner surface 28' defined by the socket 28 in base 20 surrounds a majority of the spherical outer surface 42 on the receptacle 40. Notably, in a preferred embodiment of the invention disclosure, the outer surface 42 has a diameter which is slightly larger than the diameter of the socket 28 defined by base 20 whereby providing a slight or small gap between the pieces or parts 22 and 24 of base 20 when they are arranged in operative assembled relation relative to each other.

As illustrated, receptacle 40 defines a cylindrical blind cavity 44 which opens to the spherical outer surface 42 of the receptacle 40 so as to allow the fuel containing cylinder C of torch 12 to be received, accommodated and releasably held therewithin whereby allowing the torch 12 to be adjustably positioned about any of the X, Y or Z axes and, thus, allowing the flame directing nozzle portion T to be adjustably positioned as desired. That is, cavity 44 of receptacle 40 opens only at one end to the outer surface 42 of receptacle 40 and is closed at an opposite end. Notably, the cylindrical blind cavity 44 defined by receptacle 40 has a diameter PD generally equal to or only slightly greater than the predetermined diameter PD of the fuel containing cylinder C of torch 12. More specifically, an inner surface 45 of the blind recess 44 defined by the receptacle 40 and the outer diameter of the fuel containing cylinder C of torch 12 are configured relative to each other such that a "clearance fit" is established therebetween, such that when assembled relative to each other, the fuel containing cylinder C of torch 12 is allowed to slide and/or rotate relative to inner surface 45 of the blind recess 44.

Returning to FIG. 1, a manually operable spring biased assembly 50 is arranged in operable combination with the two pieces or parts 22 and 24 of base 20. The manually operable spring biased assembly 50 is operable in either a locked condition or an unlocked condition. In the locked condition, assembly 50 is adapted to apply a first clamping force to the outer spherical surface 42 of the receptacle 40 whereby releasably maintaining the receptacle 40 in a selected and adjusted position relative to base 20. In an unlocked condition, assembly 50 applies a reduced clamping force to the outer spherical surface 42 of the receptacle 40.

The manually operable spring biased assembly 50 can take any of a variety of designs without detracting or departing from the broad spirit and novel scope of this invention disclosure. In the preferred embodiment illustrated by way of example in FIG. 1, assembly 50 embodies an identical pair of manually operable, spring draw toggle latch locks or members 54 and 54' arranged in operable combination with the two pieces or parts 22 and 24 of base 20. As illustrated, the manually operated latch locks 54, 54' are preferably mounted on the base 20 on diametrically opposed sides of the spherical socket 28.

Figure 3:
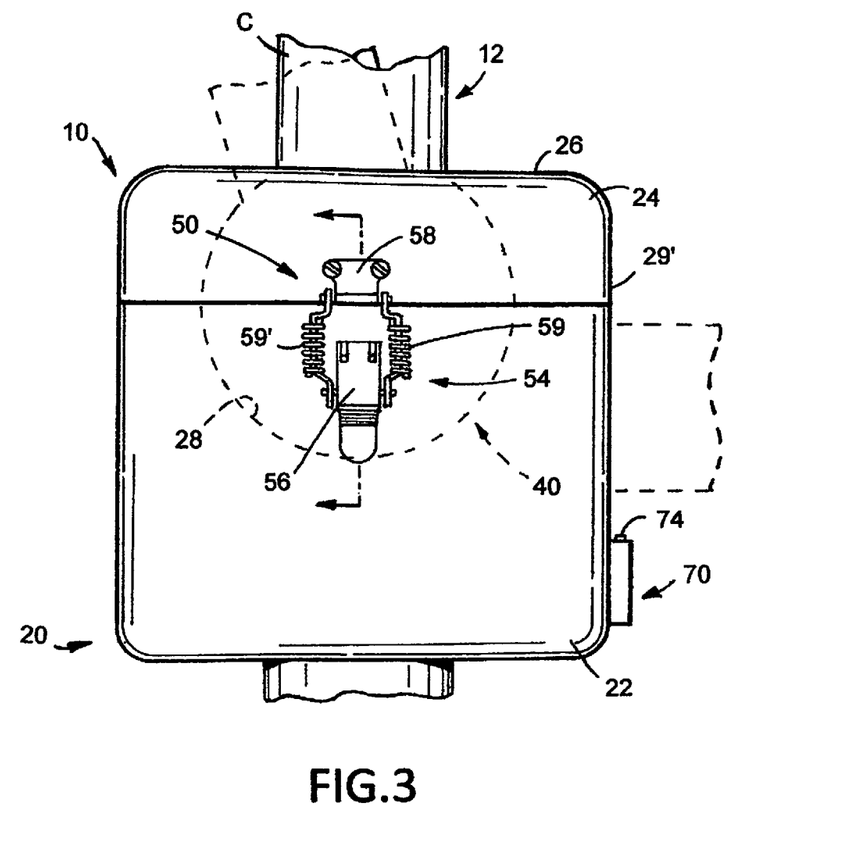
FIG. 3 is a fragmentary side elevational view of the tool illustrated in FIG. 1.
Figure 4:
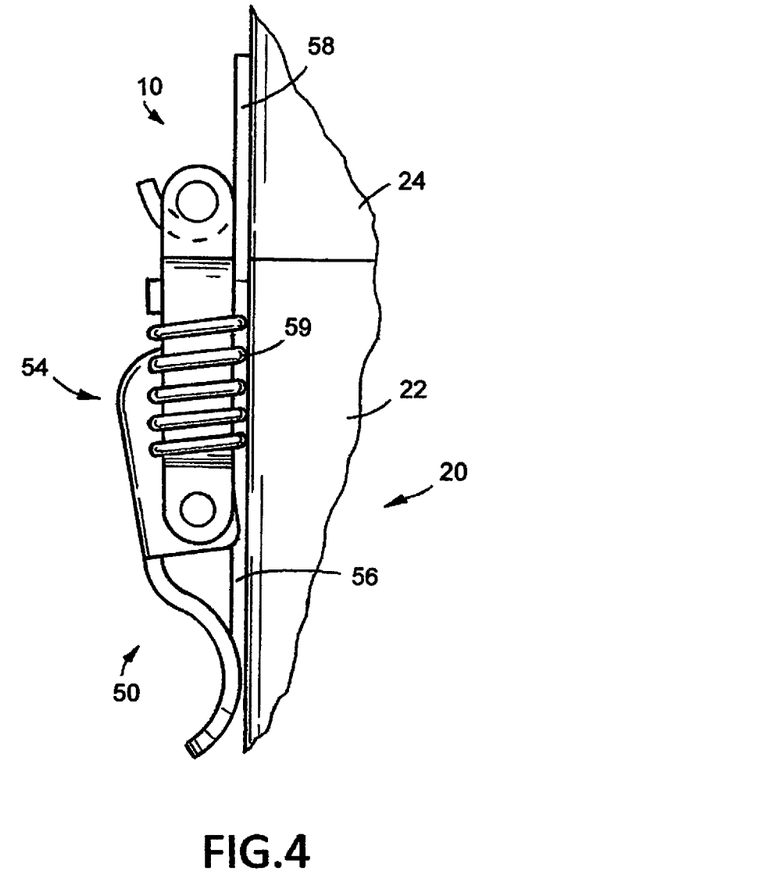
FIG. 4 is an enlarged fragmentary view of the area encircled in phantom lines in FIG. 1.
Figure 5:
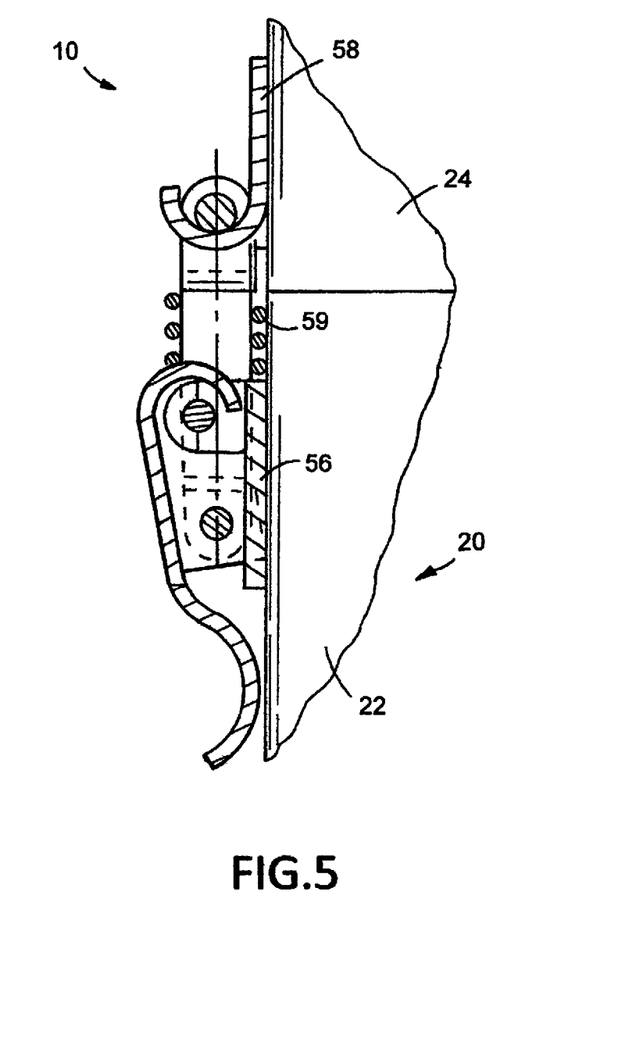
FIG. 5 is an enlarged sectional view taken along line 5-5 of FIG. 3.

Since the manually operated latch locks 54, 54' are preferably identical relative to each other, only latch lock 54 will be described in detail. As illustrated in FIGS. 3, 4 and 5, each manually operated latch lock is of a conventional design and includes first and second hasps 56 and 58. As shown by way of example in FIGS. 3 and 4, the manually operated hasp or member 56 of each latch lock is suitably secured to the first part or piece 22 of base 20 while the other hasp or member 58 of each latch lock is suitably secured to the second part or piece 24 of base 20. The hasps 56 and 58 of each latch lock are biased toward each other by springs 59, 59' which serve to urge or pull pieces or parts 22 and 24 of base 20 toward each other. Moreover, and in a preferred embodiment illustrated in FIG. 5, each latch lock has an over-center locking design which requires purposeful manual effort to release each latch lock from its locked condition.

To further enhance the range of pivotal movements of torch 12 when arranged in the tool 10, and as illustrated by way of example in FIG. 1, the two parts 22 and 24 of base 20 combine to define a closed ended, open-sided, generally vertical passageway 60. The passageway or channel 60 opens to and depends from the top 26 of and along a lengthwise portion or side of base 20. The passageway 60 has a predetermined width PW generally equal to or slightly greater than the predetermined diameter PD of the fuel containing cylinder C of torch 12. As such, passageway 60 permits the fuel containing cylinder C of torch 12 to move therethrough whereby allowing for enhanced movement and positioning of the flame directing nozzle portion T (FIG. 1) of torch 12.

A stop 62 is provided on base 20 for limiting the extent of travel of the fuel containing cylinder C of torch 12. In the embodiment illustrated by way of example in FIG. 1, stop 62 is defined by the closed end of the passageway 60 which positively engages with the fuel containing cylinder C of torch 12 to limit the travel thereof through channel 60.

As illustrated in FIG. 1, tool 10 can furthermore include a conventional programmable timer 70 suitably mounted to an exterior of base 20. As illustrated, timer 70 preferably includes a display screen 72 for visually indicating the time or a preset time. As well known in the art, timer 70 can be programmed as through actuation of suitable and readily accessible buttons 74 on time 70. Moreover, timer 70 can furthermore include either a visual or audible alarm (not shown) for indicating when the preset time on the timer 70 has expired.

Frequently, the torch 12 held by tool 10 is used in operable combination with a suitable utensil, generally indicated by reference U in FIG. 1. Largely because such a utensil is subject to the directed flame from torch 12, such utensil is typically fabricated from a ferrous metal, i.e. stainless steel or the like.

To maintain the utensil U readily convenient, the tool 10 of the present invention disclosure furthermore preferably includes one or more neodymium rare earth magnets 80 for releasably holding the utensil U in close proximate relation relative to tool 10. In one form, the one or more magnets 80 are preferably embedded within one or both of the pieces or parts 22, 24 forming the base 10. In one embodiment, the magnets 80 are disposed in proximity to the outer surface 29 of the tool 10 to enhance their holding ability.

In use, the tool 10 of the present invention disclosure can be placed on a surface S. Preferably, but not necessarily, attachment apparatus 30 holds the tool 10 on surface S. The fuel containing cylinder portion C of torch 12 is inserted endwise through the open top 26 of the second base portion 24 of tool base 20 and into the blind cavity 44 defined by the receptacle 40.

At this point in time, the manually operable spring biased assembly 50 can be in either of two conditions. That is, the manually operable spring biased assembly 50 can be in either the locked or unlocked condition. In either the locked or unlocked condition of the spring biased assembly 50, the "fit" between the exterior surface of the fuel containing cylinder C of torch 12 and the inner surface 45 defined by the blind cavity 44 of receptacle 40 allows, sets and maintains the rotational position of the flame directing nozzle portion T of torch 12. Once the rotational position of the flame directing nozzle portion T of torch 12 is selected, the torch 12 can be further adjusted about axes X, Y and Z to any of a variety of other pivotal positions. Thereafter, the manually operable spring biased assembly 50 can be moved to a locked condition, whereby applying a first clamping force against the receptacle 40 and thereby inhibiting inadvertent pivotal movement of the receptacle 40 so as to maintain the selected or chosen direction of the flame directing nozzle portion T of torch 12.

Be advised, however, with a preferred form of this invention disclosure, and even though the manually operable spring biased assembly 50 is in a locked condition, after the fuel containing cylinder portion C of torch 12 is inserted endwise into the blind bore 44 of receptacle 40, the tool 10 remains in a condition where the receptacle 40 and thereby the torch 12 at least partially held therewithin can be purposefully moved whereby allowing the flame directing nozzle portion T of torch 12 to assume another desired or preferred position. In a preferred form of this invention disclosure, and even when the manually operable spring biased assembly 50 is in a locked condition, after the fuel containing cylinder portion C of torch 12 is inserted endwise into the blind bore 44 of receptacle 40, the tool 10 remains in a condition where the torch 12 can be purposefully pivoted and adjusted about any of the axes X, Y and Z into any of a myriad of different purposefully selected positions (a few of which are illustrated in dash lines in FIGS. 1 and 3). Understandably, changing the manually operable spring biased assembly 50 to an unlocked condition would facilitate rotation of the receptacle 40 within the socket 28 defined by base 20 and about axes X, Y and Z to permit different positioning of the flame directing nozzle portion T of torch 12 but such action, with a preferred form of the invention disclosure, is not required.

From the foregoing, it will be observed that numerous modifications and variations can be made and effected without departing or detracting from the true spirit and novel concept of this invention disclosure. Moreover, it will be appreciated, the present disclosure is intended to set forth an exemplification which is not intended to limit the disclosure to the specific embodiment illustrated. Rather, this disclosure is intended to cover by the appended claims all such modifications and variations as fall within the spirit and scope of the claims.

What is claimed is:

1. A tool for releasably holding a torch having a fuel containing cylinder at one end and a flame directing nozzle at an opposite end, said tool comprising:
    a base including a first part and a second part arranged in a cooperative stacked relationship relative to each other and which combine to define a spherical socket therebetween, and with said second part of said base defining an open top;
    a positioning receptacle having an outer spherical surface, with said receptacle being configured to be retained and rotatable about X, Y and Z axes within an inner spherical surface defined by the spherical socket in said base and which substantially surrounds the outer spherical surface on said receptacle, with said receptacle defining a cylindrical blind cavity which opens to the spherical outer surface of said receptacle and is exposed to the open top of the second part of said base so as to receive, snugly and releasably hold a lengthwise portion of the fuel containing cylinder therewithin whereby allowing said torch to be adjustably positioned about any of the X, Y and Z axes so as to position the flame directing nozzle of said torch as desired; and
    a locking assembly including first and second substantially identical spring biased and manually operable mechanisms mounted on diametrically opposed sides of the spherical socket defined by said base and in operable combination with the first and second parts of said base and operable in either a locked condition or an unlocked condition, with said locking assembly being adapted to apply a first clamping force to the outer spherical surface of said receptacle when arranged in a locked condition whereby releasably maintaining said receptacle in a selected and adjusted position relative to said base and for applying a reduced clamping force to the outer spherical surface of said receptacle when in an unlocked condition.

2. The tool according to claim 1, wherein each manually operable mechanism of said locking assembly includes a first part attached to the first part of said base, a second part attached to the second part of said base, and a biasing mechanism for pulling said first and second parts of said base toward each other as along as said locking assembly is in the locked condition.

3. The tool according to claim 1, wherein said base further includes one or more magnets for releasably holding a metal device to said base.

4. The tool according to claim 1, wherein said base further includes an apparatus for releasably securing said base to a surface.

5. The tool according to claim 4, wherein said apparatus for securing said base to the surface includes a suction cup attached to a lower surface of the first part of said base.

6. A tool for releasably holding a torch having a fuel containing cylinder with a predetermined diameter at one end and a flame directing nozzle at an opposite end, said tool comprising:
    a receptacle defining a blind recess configured to receive, accommodate and releasably hold a lengthwise portion of the fuel containing cylinder of said torch therewithin, with said receptacle having a spherical outer surface;
    a base having at least two parts arranged in a cooperative stacked relationship relative to each other and defining a spherical socket therebetween, with said socket having a spherical inner surface which surrounds a majority of the spherical outer surface of said receptacle, and with a second part of said base defining an open top which opens to an open end of the recess in said receptacle;
    a locking assembly including first and second substantially identical spring biased and manually operable mechanisms mounted on diametrically opposed sides of the socket defined by said socket and in operable combination with the first and second parts of said base and operable in either a locked condition or an unlocked condition with aid locking assembly being adapted to apply a first clamping force to the outer spherical surface of said receptacle when arranged in a locked condition whereby releasably maintaining said receptacle in a selected and adjusted position relative to said base and for applying a reduced clamping force to the outer spherical surface of said receptacle when in an unlocked condition; and
    wherein the two parts of said base combine to define a closed ended and open-sided passageway which opens to and depends from the top of and along a lengthwise portion of said base, with said passageway having a predetermined width generally equal to or slightly greater than the predetermined diameter of the fuel containing cylinder of said torch so as to allow for enhanced pivotal movement of said torch whereby allowing for enhanced movement and positioning of the flame directing nozzle on said torch.

7. The tool according to claim 6, further including a programmable timer attached to said base.

8. The tool according to claim 6, wherein said base defines a stop for limiting pivotal travel of the fuel containing cylinder of said torch.

9. The tool according to claim 6, wherein said base further includes an apparatus for securing said base to a surface.

10. The tool according to claim 9, wherein said apparatus for securing said base to the surface includes a suction cup attached to a surface on one of said parts comprising said base.

11. A tool for releasably holding a torch having a fuel containing cylinder with a predetermined diameter at one end and a flame directing nozzle at an opposite end, said tool comprising:
  a base comprised of two base members arranged in a cooperative stacked relationship relative to each other and defining a spherical socket therebetween, and with one of said base members defining an open top;
  a singularly formed receptacle for receiving, accommodating and releasably holding a lengthwise portion of the fuel containing cylinder of said torch therewithin, with said receptacle having a spherical outer surface extending about a majority of the outer surface of said receptacle, with said receptacle being adapted to be received and accommodated within an inner spherical surface defined by the spherical socket defined by the members of said base such that the outer surface of said receptacle is substantially surrounded by the inner surface of said base whereby permitting pivotal movements of said receptacle in multiple and opposed directions, and with said receptacle defining a blind bore opening to the outer surface of said receptacle and to the open top of said one of said members, with the blind bore in said receptacle having a predetermined diameter substantially equal to the predetermined diameter of the fuel containing cylinder of said torch; and
  a manually operable assembly operable in either a locked condition or an unlocked condition, with said manually operable assembly including first and second substantially identical spring biased and manually operable mechanisms arranged in diametrically opposed relation to the spherical socket defined by said base and arranged in operable combination with the two base members so as to apply a first clamping force to the outer spherical surface of said receptacle when arranged in a locked condition whereby constraining said receptacle against movement relative to said base and for reducing the clamping force applied to the outer spherical surface of said receptacle when in an condition.

12. The tool according to claim 11, further including a timer mounted to an exterior of said base.

13. The tool according to claim 11, further including an apparatus for releasably securing said base to a surface.

14. The tool according to claim 11, wherein the members comprising said a combine to define a closed ended and open-sided passageway which opens to and depends from a top of and along a lengthwise portion of said base, with said passageway having a predetermined width generally equal to or slightly greater than the predetermined diameter of the fuel containing cylinder of said torch so as to allow for enhanced pivotal movement of said torch whereby allowing for enhanced movement and positioning of the flame directing nozzle on said torch.

* * * * *